UNITED STATES PATENT OFFICE 2,475,296

CATALYTIC POLYMERIZATION OF ALLYL ESTERS

Edward C. Shokal, Oakland, and Franklin A. Bent, Berkeley, Calif., assignors to Shell Development Company, San Francisco, Calif., a corporation of Delaware No Drawing. Application November 6, 1946, Serial No. 708,198

9 Claims. (Cl. 260—28.5)

This invention relates to a process for catalytically polymerizing allyl esters. More particularly, the invention pertains to a method wherein copper is employed to catalyze polymerization of allyl esters.

Metallic copper and various copper compounds have long been recognized by those skilled in the polymerization art as possessing a definite inhibiting effect towards polymerization reactions. Accordingly, this property of copper has been advantageously used to inhibit or prevent polymerization of allyl esters which form resinous polymers by additive polymerization. Thus, in esterifying allyl alcohol with dicarboxylic acids the resulting allyl ester is prevented from polymerizing by effecting the esterification in the presence of copper or its alloys according to U. S. Patent 2,249,768. Moreover, U. S. Patent 2,273,891 describes a process wherein allyl esters are polymerized and the polymerization is interrupted by addition of copper to the polymerizing mixture. These patents show the inhibiting action of copper in the polymerization of allyl esters. We also found that copper inhibits polymerization of allyl esters when the polymerization was effected at the temperatures described in the above-noted patents. However, when we effected polymerization at higher temperatures, a surprising and unexpected phenomenon was encountered. We discovered that when a certain critical temperature was reached, copper no longer had an inhibiting effect upon the polymerization. Furthermore, we found that when still higher temperatures were employed, the presence of copper actually accelerated the rate of polymerization with allyl esters.

This unusual behavior of copper toward polymerization of allyl esters will be evident from consideration of the following results. Diallyl phthalate polymerizes under the influence of heat alone, i. e. in the absence of polymerization catalysts such as peroxides. As polymerization progresses, a polymer first forms which is soluble in the monomer. The extent of polymerization of the diallyl phthalate can be followed by measuring the refractive index which is conveniently done under the standard of 20/D. By observing the increase in refractive index over that when polymerization began, a measure can be obtained of the amount of polymer formation. It was found that the increase in refractive index is linearly related to the weight percentage present in the polymerized mixture. We define 0.0001 of refractive index increase at 20/D as one RI unit. For each 50 RI units with diallyl phthalate there is contained about 10% soluble polymer in the monomer. Diallyl phthalate was heated in glass containers under a nitrogen atmosphere in the absence and in the presence of a metallic copper screen with refractive index measurements being taken at intervals. The results in terms of RI units are given in the table below. Since diallyl phthalate is a bi-functional compound capable of forming cross linkages, continuation of the polymerization beyond a certain point will result in gelation as shown in the table. The refractive index of the gel polymer cannot be determined.

|  | Temperature | | | |
| --- | --- | --- | --- | --- |
|  | 205° C. | | 225° C. | |
|  | Alone | With 20% Cu | Alone | With 20% Cu |
| Start | 0 | .0 | 0 | 0 |
| 15 min | 129 | 46 | 156 | 216 |
| 30 min | 164 | 58 | (1) | (2) |
| 45 min | Gelled | 91 | (1) | (2) |

1 Gelled at 37 min.
2 Gelled at 22 min.

The above results show that at 205° C. the presence of the copper inhibited polymerization of the diallyl phthalate, i. e. it decreased the rate of polymer formation as compared to the rate when no copper was present. On the other hand, when the temperature was 225° C. the rate of polymer formation was actually increased above that when diallyl phthalate alone was polymerized. Furthermore, the results show that with a temperature of about 215° C. copper has neither an inhibiting nor an accelerating effect upon the polymerization of allyl esters. We now utilize this unexplainable phenomenon of copper toward polymerization of allyl esters in the process of our invention.

According to the process, an allyl ester of a polybasic acid is polymerized in liquid phase under non-oxidizing conditions in the presence of copper at a temperature of from about 220° C. to below the temperature at which decomposition becomes appreciable. This upper limit of the temperature range at which decomposition of the allyl ester becomes appreciable is above about 350° C. We therefore prefer to operate at temperatures of about 220° C. to 350° C. However, at the higher range of temperature, the rate of polymerization is so greatly accelerated that polymer ordinarily forms at a faster rate than desired and it is therefore more preferable to effect the polymerization at about 225° C. to 260° C.

The copper employed as catalyst in the process need not be in any special form. The choice of the physical character of the copper catalyst is dependent mainly upon convenience and efficiency. Ordinarily, a fine powder of catalytic copper is preferred, although coarse powdered copper, copper screen, or an undivided solid mass, may be used. Colloidal copper is useful. Another useful form is spongy copper obtained in usual fashion by electrolytic deposition. Copper alloys are also suitable. Preferably such alloys contain a substantial amount of copper, i. e. 20% or more of copper. Among useful alloys are Monel metal, brass, constantan, bronze, Bell metal and German silver.

The catalytic polymerization reaction is effected with the allyl ester in liquid phase. Ordinarily the temperature of operation is such that atmospheric pressure can be used, but where necessary, owing to the temperature of operation being above the normal boiling point of the allyl ester, super-atmospheric pressures can be used to maintain the polymerizing ester in liquid phase.

Copper is suitable for catalyzing polymerization at about 220° C. and upwards of an allyl ester of any polybasic acid. Preferably there is employed a diallyl ester of a dicarboxylic acid, in which acid the carbon atoms between the carboxyl groups are only saturated carbon atoms or aromatic carbon atoms as is the case with such acids as malonic, succinic, glutaric, adipic, pimelic, sebacic, phthalic, terephthalic, isophthalic, naphthalene dicarboxylic, etc. If desired, the allyl esters of other polycarboxylic acids can be used such as those of maleic, diglycolic, fumaric, tricarballylic, itaconic and the like. Besides such esters of substantially completely esterified organic acids, there can also be catalytically polymerized the allyl esters of inorganic acids such as diallyl carbonate, triallyl borate, tetra-allyl silicate, diallyl sulfate, triallyl phosphate, triallyl aluminate and the like.

These allyl esters of polybasic acids polymerize in a particular way. A polymer is first formed which is soluble in its monomer. The formation of the soluble polymer is evidenced by the mass of liquid allyl ester becoming increasingly more viscous. After about 25% to 40% of soluble polymer has formed, continuation of the polymerization causes the mass to suddenly gel. The gel is a polymeric form of the allyl ester which is insoluble in its monomer, but which is capable of being fused so as to flow and be molded into useful articles on application of heat and pressure. At the moment the gel forms, the polymerized mass contains, besides gel polymer, soluble polymer and unpolymerized monomer. Further polymerization of the mass, or the gel alone, or the soluble polymer alone, will convert it to the ultimate polymeric form of the allyl ester which is infusible as well as being insoluble in its monomeric ester or other common solvents such as hydrocarbons, alcohols, ketones or esters.

The solution of monomeric allyl ester and its soluble polymer obtained by interrupting the polymerization before gellation occurs is a particularly useful material. In general, it is a viscous liquid which is well suited as a varnish for use in coating operations wherein the varnish is baked in the presence of peroxide catalyst or driers to a hard film. Laminated articles can be prepared from the solution wherein it is used for the bonding and embedding material for lamination of paper, cloth and the like. Furthermore, the soluble polymer contained in the solution can be concentrated or isolated by distillation of monomer therefrom so as to obtain a thermosetting resin material useful for molding operations.

The process of the invention is particularly adapted to efficient production of the solution of monomer and soluble polymer of the allyl esters. For example, the allyl ester is continuously passed into a closed reaction vessel containing a copper catalyst, the ester completely filling the reactor. The ester is maintained at the desired operating temperature above 215° C. while in the reactor. The ester is allowed to have residence in the reactor for a time sufficient to permit formation of substantial amounts of soluble polymer, e. g. about 20% to 30%. The material continuously withdrawn from the reactor is immediately cooled to 50° C.–75° C. or lower in order to check further thermal polymerization and enable the solution of monomer and polymer to be obtained. The amount of polymer formed will depend primarily on the temperature, residence time and particular allyl ester. Proper choice of residence time so the polymerization mixture can be withdrawn before gelation occurs is readily determined by trial. A correlation can first be made between refractive index and percentage of soluble polymer in its monomer, and the refractive index just before gelation occurs. A rapid rate of throughput in the reactor is first chosen and the extent of polymerization measured by the determination of refractive index of the polymer solution. The rate of throughput can then be decreased until substantial polymer formation occurs but gelation does not take place. When diallyl phthalate is polymerized in this manner, the rate is chosen so the rise in refractive index amounts to about 180 RI units. The process is efficiently executed by using two successive copper coils. The allyl ester is pumped continuously into the first coil which is maintained at about 220° C. to 350° C. wherein catalytic polymerization of the allyl ester occurs and the solution of polymer is then passed through a second copper coil maintained at about 30° C. to 100° C. In this manner the second coil enables the powerful inhibiting action of the copper to interrupt polymerization before gelation occurs.

In using copper or its alloys in the process of the invention, the polymerization is effected under non-oxidizing conditions. Allyl esters contain an olefinic group therein which is quite susceptible to oxidation. Copper is also a very active oxidation catalyst at the temperature employed in the process of the present invention. If an allyl ester is brought, in the presence of copper, into contact with an oxidizing agent such as air or other oxygen-containing gas at the operating temperatures of the present invention, oxidation or hydroxylation of the allyl ester will occur to the exclusion of the much slower and sensitive additive polymerization reaction. See, for example, U. S. Patent 2,316,604. Since the object of the present invention is to provide an efficient process for polymerizing the allyl esters, the process is effected under non-oxidizing conditions, i. e. in the absence of oxygen-containing gases or other oxidizing agents. Preferably the process is effected in the aforementioned continuous manner where the polymerizing mixture completely fills the reaction zone containing the copper catalyst. If it is desired to effect the reaction in a batchwise manner where there is a vapor space in contact with the polymerization ester and the copper catalyst, this space is maintained devoid of oxygen by using a blanket of inert gas such as nitrogen, carbon dioxide or methane.

One of the advantageous features of the process of the invention is that the catalyst cost is negligible. Copper in itself is quite cheap and the copper employed in the process can be used over and over to polymerize the allyl esters. On the other hand, the ordinary peroxide catalysts are usually somewhat expensive and are lost after being used to effect polymerization. Furthermore, peroxides like benzoyl peroxides besides being polymerization catalysts are also powerful oxidizing agents. As explained above, the presence of oxidizing agents in combination with copper at the operating temperatures of the present invention is to be avoided in order to prevent oxidation. We therefore employ metallic copper or its alloys as sole polymerization agent in the process and operate in the absence of peroxide catalysts and/or oxygen-containing gases.

Although it is ordinarily desirable to effect the polymerization with the allyl esters in bulk, it is sometimes advantageous to effect polymerization with the allyl ester in a solution of say 10% to 75% concentration of inert solvent such as a hydrocarbon like toluene, benzene or paraffin wax. The presence of non-solvents such as water, for example, serve no useful purpose in the process and are therefore preferably avoided. In other words, the polymerization is effected under substantially anhydrous conditions. The use of solvents tends to slow up the polymerization rate to some extent, but they are useful at times. For example, diallyl phthalate was polymerized in the presence of paraffin wax. About 0.3 parts by weight of copper powder were added to 170 parts of diallyl phthalate and 30 parts of paraffin wax. Heat was applied to the mixture until a temperature of about 270° C. was reached whereupon the application of heat was discontinued since the polymerization reaction, which is exothermic, began to proceed with violence. After discontinuing the heat, the temperature rose to about 300° C. with gelling of the diallyl phthalate. The time required at which the temperature was above about 215° C. until gelation occurred was only about 6 minutes. A like sample of substantially pure diallyl phthalate amounting to 170 parts by weight which was mixed with 30 parts of paraffin wax was held at about 270° C. in the absence of copper for the same period required for the gelling of the sample containing copper powder. Gelation did not occur and, in fact, there was no visible increase in viscosity of the mixture. In another experiment about 3 parts by weight of copper powder were mixed with about 200 parts of diallyl phthalate and the mixture was held at about 200° C. for 310 minutes. Only a slight increase in viscosity was noted but no gelling occurred. These experiments further bring out the inhibiting action of copper below 215° C. and its accelerating effect above that temperature.

While we have described the invention with particular reference to polymerization of allyl esters, the method is also applicable to the corresponding esters of other beta,gamma-monoolefinic monohydric alcohols in general. Thus, the process of the invention enables catalytic polymerization of polycarboxylic and polybasic inorganic oxygenated acid esters of such alcohols as methallyl alcohol, ethallyl alcohol, crotyl alcohol, methyl vinyl carbinol, 2-pentenol, 2-hexenol, etc. Such beta,gamma-monoolefinic monohydric alcohols contain the olefinic double bond between the two carbon atoms which are in beta and gamma positions with respect to the saturated alpha carbon atom containing the alcoholic hydroxyl group linked directly thereto. While such unsaturated alcohols containing any number of carbon atoms above two can be employed in the process in the form of their polybasic esters, preferably esters of alcohols containing 3 to 6 carbon atoms inclusive are used.

This application is a continuation-in-part of our copending application, Serial No. 499,728, filed August 23, 1943, now abandoned.

We claim as our invention:

1. A process for producing polymer of a beta, gamma-monoolefinic monohydric alcohol ester of a polybasic acid which ester is completely esterified, which comprises polymerizing said ester in liquid phase in the presence of metallic copper as sole polymerization catalyst under anhydrous non-oxidizing conditions at a temperature of 220° C. to below the temperature at which decomposition of said ester becomes appreciable.

2. A process for producing polymer of a diallyl ester of a dicarboxylic acid, which comprises catalytically polymerizing said ester in liquid phase under anhydrous non-oxidizing conditions by contact with metallic copper as sole polymerization catalyst at a temperature of 220° C. to 350° C.

3. A process for producing polymer of a diallyl ester of a dicarboxylic acid, which acid contains only aromatic carbon atoms bridging the carboxyl groups, comprising catalytically polymerizing said ester in liquid phase under anhydrous non-oxidizing conditions by contact with metallic copper as sole polymerization catalyst at a temperature of 220° C. to 350° C.

4. A process for producing polymer which comprises polymerizing diallyl phthalate in liquid phase in the presence of metallic copper as sole polymerization catalyst under anhydrous non-oxidizing conditions at a temperature of 220° C. to below the temperature at which decomposition of said ester becomes appreciable.

5. A process for producing polymer from diallyl phthalate which comprises catalytically polymerizing diallyl phthalate in liquid phase under anhydrous non-oxidizing conditions by contact with metallic copper as sole polymerization catalyst at a temperature of 225° C. to 260° C.

6. A process for producing a solution of soluble polymer of diallyl phthalate in monomeric diallyl phthalate, which comprises contacting diallyl phthalate in liquid phase under anhydrous non-oxidizing conditions with metallic copper as sole polymerization catalyst at 220° C. to 350° C. for a time sufficient to effect formation of appreciable polymer soluble in the monomer but for less time than is required to cause gelation of the ester.

7. A process for polymerizing diallyl phthalate in admixture with normally solid paraffin wax under anhydrous non-oxidizing conditions in liquid phase and in the presence of metallic copper as sole polymerization catalyst at 220° C. to 350° C.

8. A process for polymerizing a diallyl ester of a dicarboxylic acid in which acid the carbon atoms separating the carboxyl groups are saturated carbon atoms comprising catalytically polymerizing said ester in liquid phase under anhydrous non-oxidizing conditions by contact with metallic copper as sole polymerization catalyst at a temperature of 220° C. to 350° C.

9. A process for producing polymer which comprises contacting liquid diallyl diglycolate with metallic copper as sole polymerization catalyst under anhydrous non-oxidizing conditions at a temperature of 220° C. to 350° C.

EDWARD C. SHOKAL.
FRANKLIN A. BENT.

REFERENCES CITED

The following references are of record in the file of this patent:

UNITED STATES PATENTS

| Number | Name | Date |
|---|---|---|
| 2,160,933 | Wiley | June 6, 1939 |
| 2,339,058 | D'Alelio | Jan. 11, 1944 |

OTHER REFERENCES

Berkman et al. "Catalysis" pub. by Reinhold Pub. Corp., N. Y. 1940, pages 961, 964, 965, 972, 973, 980–2, 984, 985.